United States Patent [19]

Johnson

[11] 3,739,287
[45] June 12, 1973

[54] PHASE DIFFERENCE DETECTION CIRCUIT

[75] Inventor: Stanley Jerome Johnson, North Aurora, Ill.

[73] Assignee: Bell Telephone Laboratories, Incorporated, Murray Hill, N.J.

[22] Filed: Nov. 15, 1971

[21] Appl. No.: 198,867

[52] U.S. Cl. .................................. 218/133, 328/134
[51] Int. Cl. .............................................. H03b 3/04
[58] Field of Search.......................... 328/133, 134; 307/233, 232; 324/79

[56] References Cited
UNITED STATES PATENTS

| | | | |
|---|---|---|---|
| 3,307,116 | 2/1967 | Williams | 328/134 |
| 3,631,351 | 12/1971 | Paine | 328/133 |
| 3,660,647 | 5/1972 | Pryor | 328/133 |
| 3,005,165 | 10/1961 | Lenigan | 331/11 |
| 2,864,954 | 12/1958 | Byrne | 328/133 |
| 2,866,092 | 12/1958 | Raynsford | 328/154 |
| 3,521,172 | 7/1970 | Harmon | 328/133 |
| 3,585,508 | 6/1971 | Crowther | 328/134 |
| 3,600,690 | 8/1971 | White | 328/133 |
| 3,614,635 | 10/1971 | LaPine | 307/233 |
| 3,634,772 | 1/1972 | Katz | 328/134 |

Primary Examiner—John W. Huckert
Assistant Examiner—R. E. Hart
Attorney—W. L. Keefauver

[57] ABSTRACT

A circuit for synchronizing a local sine wave oscillator to a master oscillator is disclosed. A strobe pulse is derived during each cycle period of the locally generated sine wave in such a manner that the strobe pulse is centered about the midpoint of the cycle period. The phase difference between the two waves is measured by a comparison of the coincidence of each strobe pulse with the positive portion of the master wave and with the positive portion of the master wave delayed by 180°.

11 Claims, 2 Drawing Figures

3,739,287

PHASE DIFFERENCE DETECTION CIRCUIT

BACKGROUND OF THE INVENTION

1. Field of the Invention

The invention relates to a synchronization arrangement and more particularly relates to detection of phase difference between two waveforms.

2. Description of the Prior Art

Phase detector circuits using transformers and balanced diode peak detectors are well known in the art. Ideally, such phase detectors are perfectly balanced and, even in the presence of noisy input signals, generate output signals proportional to the signal phase only. In practice, however, such balance is never perfect and the circuit may be particularly sensitive to temperature variations affecting the circuit elements. Furthermore, greater current driving capabilities are required to obtain transformer output voltages which are significantly greater than the voltage drop of the diodes when very high frequency signals are applied to such phase detection circuits.

SUMMARY OF THE INVENTION

A new technique for detection of phase difference between two oscillatory waves has been invented which does not use transformers and which does not depend on balanced circuits. In accordance with this invention, the first of the two waves is delayed by the period of time that the first wave is positive with respect to a selected reference line (e.g., one half of the cycle period of a sine wave). A strobe pulse is derived for each cycle period of the second wave in such a manner that its center point is coincident with the point at which the second wave crosses a corresponding reference line. Comparison of coincidence of the strobe pulses with the delayed and the nondelayed first wave gives a measure of the phase difference between the first and the second wave. Specifically, in the case where the phase difference between two sinusoidal waves is to be measured, the first wave is delayed by 180° and the midpoint of each of the strobe pulses coincides with the midpoint of the corresponding cycle period of the first wave. When the two waves are in phase with each other, the strobe pulse will have equal coincidence with both the delayed and the nondelayed wave and no phase difference is detected. However, if the two waves are not in phase, an error signal proportional to the difference in coincidence of the strobe pulse with the delayed wave and with the nondelayed wave will be generated.

In one illustrative embodiment of my invention, a local sine wave oscillator is synchronized to a master sine wave. The master sine wave is delayed by 180° and the positive portion of the master wave and the delayed wave are shaped and clipped in order to amplify the waves at the point of interest. Strobe pulses are derived from the locally generated sine wave by delaying the wave by somewhat less than 180°, by shaping and clipping the positive portion of the wave, and by applying the shaped pulse to a shorted delay line. The delay introduced in the local wave prior to shaping defines the starting point of the strobe pulse and the physical length of the shorted delay line defines the width of the strobe pulse. A signal, proportional to the difference in coincidence of the strobe pulses with the delayed and nondelayed master wave, is applied to the local oscillator to adjust its phase relative to that of the master wave.

DESCRIPTION

Figure 2:
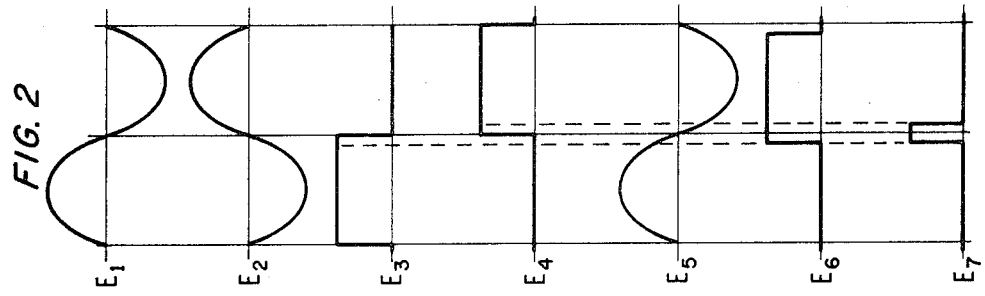
FIG. 2 is a representation of waveforms generated at the identified points of the circuit of FIG. 1.
Figure 1:
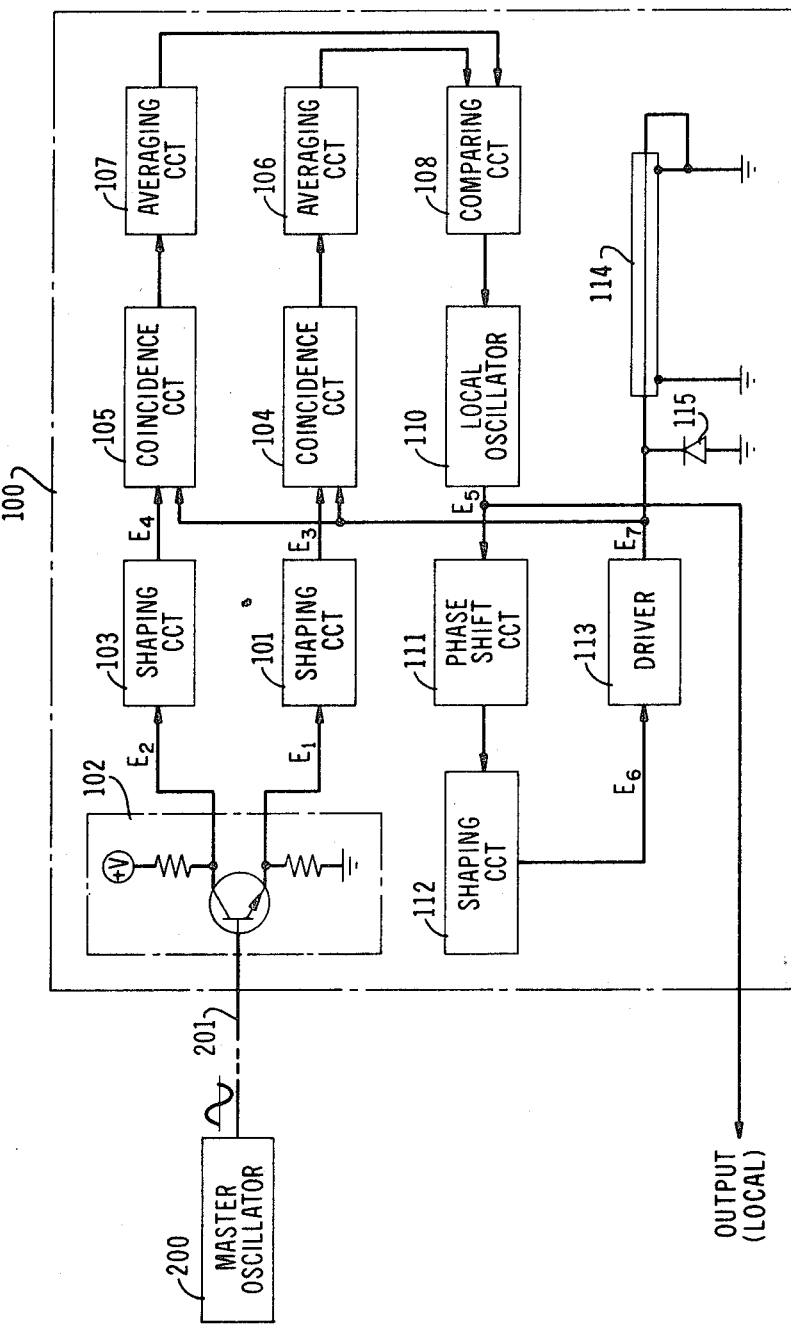
FIG. 1 shows in block diagram form the various elements of an illustrative embodiment of my invention.

The operation of the illustrative circuit shown in FIG. 1 will now be discussed with reference to both FIGS. 1 and 2. The circuit of FIG. 1 includes a local oscillator 110 which may be any known voltage controlled oscillator. A master oscillator 200 is also shown. Both oscillators are assumed to be capable of generating an accurate repetitive wave such as a sine wave. The master sine wave is transmitted to the circuit contained in the block 100 via a conductor 201 and is fed to the amplifier circuit 102. The amplifier 102 produces two output waves, one having the same phase as the input wave, the other being the inverse of the input wave which is equivalent to being delayed by 180°. FIG. 2 shows the master sine wave and the delayed wave as they occur on the conductor labeled E1 and E2. The master sine wave and the delayed wave are applied to shaping circuits 101 and 103, respectively, each of which greatly amplifies and shapes the input sine wave so as to change its positive portion into a substantially square pulse. Representations of the output signals of the circuits 101 and 103 as they appear on conductors E3 and E4, respectively, are shown in FIG. 2.

Phase difference between the master wave and the wave generated by the local oscillator 110 is detected by comparing the coincidence of a series of strobe pulses derived from the locally generated wave and the signals appearing on conductors E3 and E4. The strobe pulses are generated on conductor E7 and one such pulse is represented in FIG. 2. Each strobe pulse is centered about the midpoint of a cycle period of the local sine wave and has a controlled width. Coincidence of the strobe pulses with the nondelayed and delayed waves as occurring on conductors E3 and E4 is measured by the coincidence circuits 104 and 105, respectively. These coincidence circuits may be logic AND gates which produce a specified output voltage as long as coincidence exists between the applied input signals. The pulsed output signals of the coincidence circuits 104 and 105 are applied to the averaging circuits 106 and 107, respectively. These averaging circuits may be simply R-C circuits which provide signals to the comparing circuit 108 which represent an average of the pulses generated by the coincidence circuits 104 and 105. The comparing circuit 108 may be any known differential amplifier which produces output signals proportional to the relative values of the input signals applied thereto. These signals are applied to the local voltage controlled oscillator 110, thereby causing the phase of the locally generated wave to be shifted until the signals emanating from the averaging circuits 106 and 107 are of equal value.

Since each strobe pulse occurring on conductor E7 is calculated to be centered about the midpoint of a cycle period of the locally generated sine wave, the strobe pulse should have equal coincidence with the nondelayed pulse on conductor E3 and the delayed pulse on conductor E4, when the local wave is in exact phase with the master wave. Any phase difference between the local wave and the master wave will result in some difference in coincidence of the strobe pulses with the square waves occurring on conductors E3 and E4. If a wide strobe pulse is used, a small phase shift will cause the voltage level applied to the comparing circuit 108 to be only slightly greater than the other voltage level applied thereto. Thus, the comparing circuit 108 would be comparing voltage levels which are in a nearly one-to-one ratio. However, if a very narrow strobe pulse is used, only a slight phase shift will result in coincidence of the strobe pulses with only one of the two waves occurring on conductors E3 and E4. As a result, a near zero voltage level would be applied to one of the inputs of the comparing circuit 108 and substantially greater voltage level would be applied to the other input of that circuit. Thus, a small phase shift is more easily detected when a very narrow strobe pulse is used than when a wide strobe pulse is used.

A series of narrow strobe pulses, each pulse being centered about the midpoint of a cycle period of a local sine wave, is produced by the combination of the phase shift circuit 111, the shaping circuit 112, and the driver circuit 113, and the shorted delay line 114, all of which are known circuit elements. The sine wave generated by the local oscillator 110 is applied to the phase shift circuit 111 which shifts the sine wave by somewhat less than 180°. This shifted sine wave is applied to the shaping circuit 112 which, like the shaping circuits 101 and 103 discussed above, shapes the positive portion of the sine wave into a series of substantially square pulses. The square pulses are applied to the shorted delay line 114 through a driver circuit 113 to generate the desired narrow strobe pulse. FIG. 2 shows the time relation between the locally generated sine wave occurring on conductor E5, a square pulse as it occurs on conductor E6, and a strobe pulse as it occurs on conductor E7. As is well known, when a pulse is applied to a shorted delay line, it is reflected and a pulse of the same amplitude but opposite polarity is produced at the input to the shorted delay line a period of time after the pulse was applied. The time delay between the application of a pulse and the arrival of a reflected pulse is a well known function of the characteristics of the delay line and is accurately adjustable. A pulse of almost any desired width may be generated by adjusting the round trip delay of the delay line 114 to be equal to the width of the desired pulse and adjusting the phase shift circuit 111 such that the leading edge of the square pulse applied to the delay line 114 precedes the midpoint of the cycle period of the local sine wave by a period of time equal to one half the width of the desired strobe pulse. The clamping diode 115 shown in FIG. 1 serves to eliminate any negative spikes which might occur at the input to the delay line 114.

It is to be understood that the above described circuit arrangement is merely illustrative of the application of the principles of my invention; numerous other arrangements may be devised by those skilled in the art without departing from the spirit and scope of the invention. Specifically, it should be apparent that the functions of the master and local waves may be interchanged.

What is claimed is:

1. An arrangement for detecting phase difference between first and second oscillatory electrical signals comprising:
    means for delaying the first signal by a predetermined period of time;
    means responsive to the second signal to produce a series of strobe pulses wherein each of said pulses is time centered about a selected zero crossing in an oscillation cycle of said second signal;
    means for generating coincidence signals representative of the coincidence of said strobe pulses with said first oscillatory signal and with said first oscillatory signal delayed by said predetermined period of time; and
    means responsive to said coincidence signals to generate phase difference signals.

2. The arrangement in accordance with claim 1 wherein said means for generating coincidence signals comprises first circuit means responsive to said strobe pulses and said first oscillatory signal to generate a first coincidence signal and second means responsive to said strobe pulses and said delayed oscillatory signal to generate a second coincidence signal, and
    wherein said means for generating phase difference signals is responsive to said first and said second coincidence signals to generate a phase difference signal proportional to the difference of said first and said second coincidence signals.

3. An arrangement for detecting phase difference between periodic oscillatory electrical signals comprising:
    means responsive to a first of said oscillatory signals to generate a delayed oscillatory signal which is delayed from said first oscillatory signal by a delay period which is approximately equal to the time period in which the first oscillatory signal is positive with respect to a selected reference potential;
    means responsive to a second of said oscillatory signals to generate a strobe pulse corresponding to each cycle period of said second oscillatory signal, the midpoint of said strobe pulse being delayed from the starting point of the corresponding cycle period by said delay period;
    means for generating coincidence signals representative of the coincidence of said strobe pulses with said first oscillatory signal and with said delayed oscillatory signal; and
    means responsive to said coincidence signals for generating phase difference signals.

4. An arrangement for measuring phase difference between sinusoidal electrical signals comprising:
    means responsive to a first of said sinusoidal signals to generate a strobe pulse corresponding to each cycle period of said first sinusoidal signal, each strobe pulse having its midpoint in approximate coincidence with the midpoint of the corresponding cycle period;
    means responsive to a second of said sinusoidal signals to generate a delayed sinusoidal signal which is delayed from said second sinusoidal signal by a period of time equal to one half of the cycle period of said second sinusoidal signal;
    coincidence circuit means for generating signals representative of the coincidence of said strobe pulses with said second sinusoidal wave and said delayed sinusoidal wave; and
    means responsive to said coincidence signals for generating signals representative of the difference of coincidence of said strobe pulses with said second oscillatory signal and said delayed oscillatory signal.

5. The arrangement in accordance with claim 4 and further comprising shaping circuits connected to said coincidence circuit means for converting said second sinusoidal signal and said delayed sinusoidal signal to a series of approximately square pulses.

6. The arrangement in accordance with claim 4 wherein said means for generating strobe pulses comprises a shaping circuit for converting said first sinusoidal signal to a series of approximately square pulses, and a shorted delay line responsive to said approximately square pulses to generate said strobe pulses.

7. An arrangement for detecting phase difference between periodic oscillatory electrical signals comprising:
means for delaying a first of the oscillatory signals by a predetermined period of time;
means for generating a strobe pulse corresponding to each cycle period of a second of the oscillatory signals, the midpoint of each strobe pulse being delayed from the starting point of the corresponding cycle period by said predetermined period of time; and
means for measuring the difference between the coincidence of the strobe pulse with the first oscillatory signal and with the delayed oscillatory signal.

8. In combination:
first means responsive to an input oscillatory signal for generating at an output terminal a first constant potential when said input signal is positive;
second means responsive to said input signal for generating at an output terminal a second constant potential when said input signal is negative;
a variable frequency oscillator, comprising an input terminal and an output terminal, for generating at said output terminal a repetitive oscillatory signal;
third means connected to the output terminal of said oscillator for repetitively producing at an output terminal pulses of selected time duration, time centered about one of the zero crossings occurring during each oscillation of the signal generated by said oscillator;
means comprising an output terminal connected to said input terminal of said oscillator and input terminals respectively connected to the output terminals of said first, second, and third means for generating oscillator control signals.

9. The combination of claim 8 wherein said means for generating oscillator control signals comprises:
a first coincidence circuit comprising an output terminal, a first input terminal connected to said output terminal of said first means, and a second input terminal connected to said output terminal of said third means; and
a second coincidence circuit comprising an output terminal, a first input terminal connected to said output terminal of said second means, and a second input terminal connected to said output terminal of said third means.

10. The combination of claim 9 wherein said means for generating oscillator control signals further comprises:
a first averaging circuit comprising an output terminal, and an input terminal connected to said output terminal of said first coincidence circuit;
a second averaging circuit comprising an output terminal, and an input terminal connected to said output terminal of said second coincidence circuit; and
a comparing circuit comprising an output terminal connected to said input terminal of said oscillator, an input terminal connected to said output terminal of said first averaging circuit, and an input terminal connected to said output terminal of said second averaging circuit.

11. The combination of claim 10 wherein said third means comprises:
a phase shift circuit, comprising an output terminal, and an input terminal connected to said output terminal of said oscillator, for shifting the signals appearing at said output terminal of said oscillator by a selected amount;
fourth means comprising an output terminal connected to said second input terminals of said first and second coincidence circuits, and an input terminal connected to said output terminal of said phase shift circuit, for generating a constant potential in response to a portion of each oscillation cycle of the signal appearing at the output terminal of said phase shift circuit; and
a shorted delay line having a delay characteristic related to said selected amount of phase shift and connected to said output of said fourth means.

* * * * *